United States Patent [19]
Jones et al.

[11] 3,859,580
[45] Jan. 7, 1975

[54] APPARATUS FOR CONTROLLING TRAVELING BRIDGES

[75] Inventors: Marvin A. Jones, Chicago; Joseph Galuska, Elmwood Park, both of Ill.

[73] Assignee: FMC Corporation, Chicago, Ill.

[22] Filed: Sept. 28, 1973

[21] Appl. No.: 401,936

[52] U.S. Cl. .............................. 318/280, 318/282
[51] Int. Cl. ............................................... H02p 3/00
[58] Field of Search ............ 318/65, 265, 266, 256, 318/280, 282, 286, 480, 468; 187/29

[56] References Cited
UNITED STATES PATENTS

| | | | |
|---|---|---|---|
| 2,196,564 | 4/1940 | Nielsen | 187/29 |
| 2,768,749 | 10/1956 | Easterday | 318/282 X |
| 2,959,138 | 11/1960 | Foster | 318/282 X |

Primary Examiner—David Smith, Jr.
Assistant Examiner—W. E. Duncanson, Jr.
Attorney, Agent, or Firm—Dressler, Goldsmith, Clement & Gordon, Ltd.

[57] ABSTRACT

A sewage treatment tank having several traveling bridges reciprocated thereon is disclosed herein. The bridges are driven by separate reversible motors each of which is controlled by a separate circuit and each circuit includes primary and secondary position responsive means. The secondary position responsive means will continue operation of the traveling bridge after the primary circuit means has malfunctioned. One bridge also carries means for actuating the position responsive means on the other bridge to prevent collision of adjacent bridges.

15 Claims, 2 Drawing Figures

3,859,580

APPARATUS FOR CONTROLLING TRAVELING BRIDGES

BACKGROUND OF THE INVENTION

The present invention relates generally to sewage treatment tanks and more particularly to rectangular tanks having traveling bridges supported thereon. In recent years the use of rectangular tanks for sewage treatment has become common because the entire treatment facility can be installed in a smaller area than is necessary when circular tanks are used. One type of treatment facility for the treatment of waste material is what is referred to as an activated sludge-type treatment of sewage and industrial waste. In the activated sludge process, the waste material is delivered to an aeration tank where oxygen is provided in quantities to satisfy a substantial portion of the Biochemical Oxygen Demand (B.O.D.). The aerated mixture is then delivered to a settling tank where the solid waste settles to the tank bottom. The solid waste or settled sludge is then withdrawn and returned to the aeration tank for further processing.

In this type of treatment facility, it is important to return the settled sludge to the aeration tank in a minimum period of time. If the sludge remains in the settling tank too long under the anarobic conditions, the organisms undergo a transformation after which it is difficult to restore their previous active condition. Another problem encountered is that if the slude remains in the settling tank too long, it may become septic in which condition the sludge is difficult to settle and in floating interferes with the settling operation.

A further problem encountered in the activated sludge treatment process is that the rate of withdrawal is limited by the maximum speed that the withdrawal mechanism can be traveling without returning the settled sludge to a suspended condition.

With the recent emphasis on increased size and capacity of treatment facilities, it has become necessary to install numerous tanks to accommodate the amount of sewage that must necessarily be processed at a certain facility close to a metropolitan area. The installation of numerous tanks increases the overall investment required for developing a large treatment facility.

SUMMARY OF THE INVENTION

The present invention allows for the use of settling tanks of a size considerably greater than was heretofore possible in treatment facilities utilizing the activated sludge process. Stated another way, the invention allows for the construction of aeration and settling tanks of virtually unlimited width.

This is accomplished by having a plurality of traveling bridges located in a single settling tank and individually controlling each of the traveling bridges through separate circuits. Each electrical circuit for controlling a reversible motor that drives the bridge incorporates primary and secondary position responsive means arranged so that the secondary position responsive means will continue the operation of the motor should the primary position responsive means malfunction.

More specifically, each electric circuit incorporates a forward and reverse driving circuit and each has a relay incorporated therein which actuates the motor for operation in opposite directions. The electric circuit means also incorporates relay means that are connected to the respective circuits and to the primary and secondary position responsive means with the relay means having a first position that connects the circuit to the primary position responsive means and a second position connecting the circuits to the secondary position responsive means.

Each electric circuit means also incorporates a holding circuit for holding the relay means in the second position after the secondary position responsive means has been actuated so that the circuit will automatically remain conditioned for operation by the secondary position responsive means.

The respective traveling bridges are reversed at selected locations by fixed stops that cooperate with the position responsive means, and one stop is positioned to control the reversal of two adjacent bridges. Also, one of the bridges carries actuating means for actuating the position responsive means on the next adjacent bridge.

In the specific embodiment illustrated, the position responsive means are in the form of two position switches that are moved between positions by fixed stop or trip means. The switches are located on one bridge so that the two adjacent bridges overlap adjacent the center of the area covered by the respective bridges.

DETAILED DESCRIPTION

Figure 1:
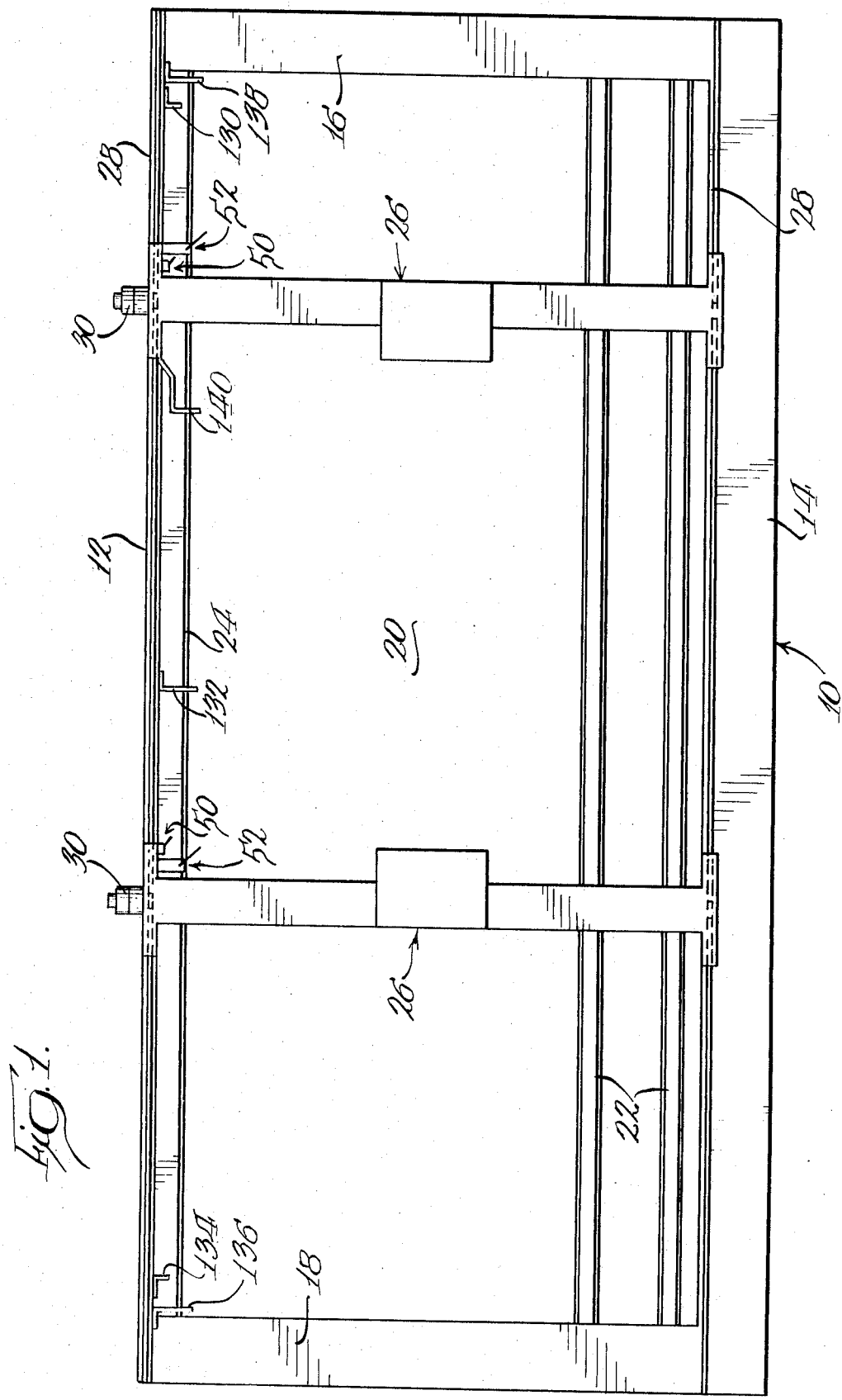
FIG. 1 shows a plan view of a rectangular settling tank having a plurality of bridges supported thereon.

While this invention is susceptible of embodiment in many different forms, there is shown in the drawings and will herein be described in detail a preferred embodiment of the invention, with the understanding that the present disclosure is to be considered as an exemplification of the principles of the invention and is not intended to limit the invention to the embodiment illustrated.

FIG. 1 shows a rectangular settling tank generally designated by the reference numeral 10 and consisting of end walls 12 and 14 as well as side walls 16 and 18 and a bottom wall 20. End wall 12 has a plurality of ports (not shown) located below the upper surface thereof and the ports receive liquid from an adjacent aeration tank (not shown). In addition, the tank has one or more effluent troughs 22 located adjacent the opposite end of wall 14. The effluent troughs have bottom walls and side walls, the upper edges of which define weirs that define the liquid level in the tank. The respective effluent troughs are connected to an outlet conduit (not shown).

In the operation of the apparatus so far described, liquid having entrained solids suspended therein flows through the inlet ports in inlet wall 12 and is directed downwardly by a baffle 24 which has upper and lower edges resectively located above and below the liquid level in the tank. The liquid flows towards the outlet end defined by effluent troughs 22 while the entrained solids settle to the tank bottom 20. Thus, clarified liquid is delivered to the effluent troughs.

The settled solids or sludge that settles to the tank bottom is removed through sludge withdrawal means (not shown) carried by traveling bridges 26 that are supported on rails 28 located on the top surface of end walls 12 and 14. Each of the traveling bridges 26 is reciprocated along the rails 28 by an electric motor 30. The reversible electric motor is controlled by circuit means that is most clearly shown in FIG. 2. Since the respective circuit means for the two reversible motors 30 are identical in construction, only one has been shown and will be described.

Electric power for motor 30 is supplied from a source 32 through wires 34 and two sets of normally open contacts 36 and 38 that are located in parallel circuits between source 32 and motor 30. When one set of contacts is closed, the motor will be rotating in one direction while when the second set is closed, the motor will be rotating in the opposite direction.

The circuit means for closing the normally open contacts 36 and 38 has power supplied thereto from a transformer 42 and lines 44 and 46. The control circuit means for driving and reversing the reversible motor means includes a primary position responsive means or limit switch 50 and a secondary position responsive means or limit switch 52. Limit switches 50 and 52 are two-position switches or contacts that are held in either position by suitable biasing means. Both switches or position responsive means 50 and 52 are independently or respectively connected through relay means 54 to a first or reverse circuit 58 and a second or forward circuit 56. The details of the connections between the circuits and the relays as well as the position responsive means will now be described.

Primary position responsive means 50 includes a switch having a first set of terminals 64-1 and 64-2, a second set of terminals 64-3 and 64-4 and a maintained contact switch arm or contact 64 movable between two positions to interconnect the respective sets of terminals.

Secondary position responsive means 52 incorporates two two-position switches with switch contact 72 having terminals 72-1, 72-2, 72-3 and 72-4 associated therewith. Switch contact 74 likewise has four terminals 74-1 through 74-4 with switch contact movable between positions to interconnect the respective sets of terminals.

Relay means 54 incorporates three two-position contacts 80, 82 and 84 each having four terminals -1 through -4.

Terminals 84-2 and 84-4 of switch contact 84 in relay means 54 are connected through line 90 to starter coil 92 in the second circuit 56 and starter coil 92, when energized, closes normally open contacts 36 leading to motor 30 and opens normally closed mechanical interlock 94 in the first circuit 58 when contact 64 is on terminals 64-3 and 64-4. Terminals 80-2 and 80-1 through contact 80 are connected to the first circuit 58 through lines 100 and 102 leading to and from a selector switch 104.

The circuit also has a line 109 with time delay 111 therein. Time delay 111 has normally closed contact 113 in parallel with normally open contacts 114 and 115 in line 109. In addition, line 109 has parallel normally open contacts 116 and 117 and three normally closed overload contacts 118 cooperating with motor 30.

Assuming that the switch 104 is in the operative position and reverse starter coil 106 is energized, contacts 115 and 117 in line 109 are closed so that time delay 111 is energized and time delay contact 113 is opened.

The switch contact 64 of the primary position responsive means 50 is in the position shown on terminals 64-1 and 64-2 and the circuit is completed to starter coil 106 through line 110, contact 82, line 120 leading from terminal 82-1 to terminal 64-1, through contact 64, line 122, contact 80 and lines 100 and 102. In this position, the normally open contacts 38 are closed to energize motor 30 in one direction while mechanical interlock 108 in circuit 56 is open to prevent energizing starter coil 92. When the contact 64 of primary position responsive means 50 is moved to the second position at the end of the bridge travel, starter coil 106 is de-energized and contacts 115 and 117 are opened to de-energize time delay 111 which in turn closes time delay contact 113 after set seconds of timing. At the end of the time set by time delay 111, (which may be set at any time from 1 to 1100 seconds to allow the bridge to come to a complete stop and produce any desired dwell time), contact 113 is closed to complete circuit 56 from line 120 through contact 64 on terminals 64-3 and 64-4 as well as line 130 through contact 84 and through line 90 to energize starter coil 92 and close contacts 36 while opening mechanical interlock 94. Energizing starter coil 92 closes contacts 114 and 116 to continue to maintain the circuits energized.

Contacts 64 in the respective position responsive means 50 located on the two bridges 26 shown in FIG. 1 are moved between positions by spaced trip means or stop means 130, 132 and 134 located at spaced points along one wall or both walls of the tank 10. Assuming that there are two bridges 26 located in one tank, stop or trip 132 will be positioned centrally between opposite side walls 16 and 18 to actuate both position responsive means 50 on the respective bridges. Also, the two position responsive means 50 for the respective bridges are located so that the two bridges will traverse a common area in the center of the tank. Stated another way, the two position responsive means 50 are located on the same side of the respective bridges so that both bridges will traverse a common area adjacent the stop 132.

The control means for the two bridges illustrated in FIG. 1 also incorporate means on one of the bridges for actuating the position responsive means on the other bridge when the two bridges approach each other to prevent collision. This means is illustrated in FIG. 1 as an arm 140 extending from one of the bridges at a higher elevation than stop 132 and aligned with the actuating means for the position responsive means 50 on the next adjacent bridge. Thus, assuming that the two bridges are approaching each other and reach the center position at approximately the same time, the left-hand bridge, as viewed in FIG. 1, will be reversed before reaching the stop 132 while the right-hand bridge will continue and be reversed by the stop 132.

The operation described above will continue so long as the primary position responsive means are actuated when the respective bridges reach the stops 130, 132 and 134. However, assuming one of the primary position responsive means fails to reverse when it reaches a stop, the secondary position responsive means 52 will become operative and will continue the operation of the associated bridge.

Figure 2:
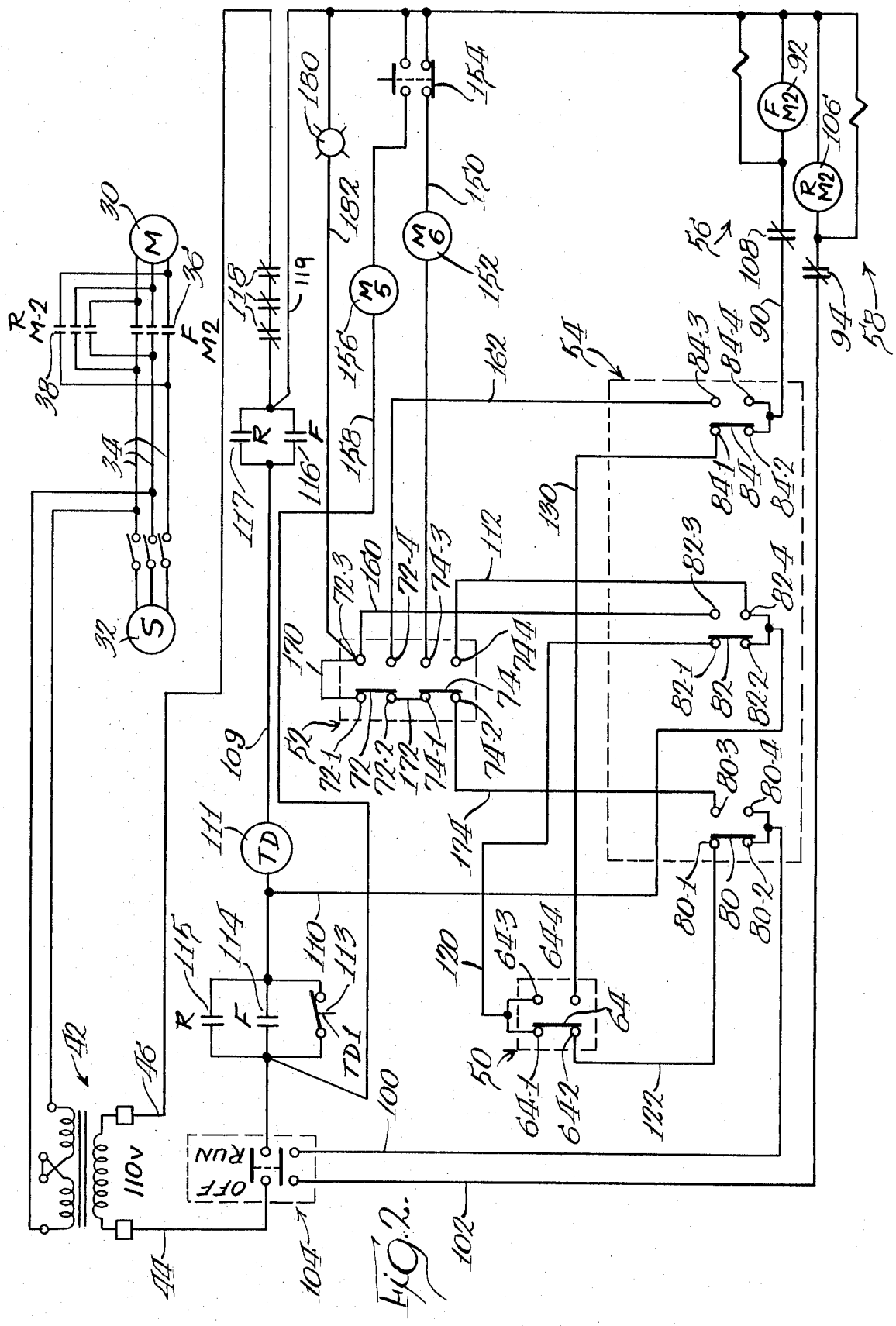
FIG. 2 is an electrical schematic view showing the control circuit means for each of the bridges.

Referring to FIG. 2, and assuming the circuit means has all of its switches in the position shown with the selector switch 104 in the operative position, when the associated bridge has traveled past a point where primary position responsive means 50 should have been operated, secondary position responsive means 52 will be actuated by stops or trips 136 or 138 and will move contacts 72 and 74 from the position shown to a second position. In this position, terminals 74-3 and 74-4 and 72-3 and 72-4, will be interconnected and power will be supplied through line 112 and line 150 to energize relay coil 152.

Energizing relay coil 152 will move contacts 80, 82 and 84 in relay means 54 from the first position shown to a second position and contacts 80, 82 and 84 of relay means 54 will be held in the second position with a mechanical latch (not shown). In this position, starter coil 92 will be energized by power from contact 82 through contacts 84 and 72 through line 160 through contact terminal 72-3 and 72-4, line 162 and terminals 84-3 and 84-4 of contact 84.

When the bridge reaches the opposite extreme position, contacts 72 and 74 will be moved to the first position shown and starter coil 106 will be energized through line 160, terminal 72-3, line 170, contact 72 on terminals 72-1 and 72-2, line 172, contact 74 on terminals 74-1 and 74-2 and line 174, contact 80 on terminals 80-3 and 80-4, line 100, through selector switch 104, through line 102 to coil 106 through contacts 38 to motor 30.

Once the secondary position responsive means 52 has been actuated, the bridge will continue to operate on the secondary position responsive means without regard to the change of position of primary switch responsive means until an operator corrects the malfunction and manually energizes holding coil 156 with time delay 111 de-energized by moving switch 154 from the position shown and de-energize relay coil 152 while energizing holding coil 156 which will move contacts 80, 82 and 84 to the first position shown in FIG. 2.

It is desirable to have an indication when the bridge is operating on the second position responsive means and this indication is in the form of a light or warning device 180 located in a line 182 between terminal 72-3 and main line 46. Since terminal 72-3 is at all times energized when the bridge is operating on the secondary position responsive means, the warning device 180 will remain energized at all times. A second light 186 may be located between lines 44 and 46 to show when the circuit is energized.

Another feature of the invention is the fact that the entire circuit is automatically de-energized whenever overload contacts 118 are opened. This is accomplished by having circuits 56 and 58 as well as the primary and secondary position responsive means 50 and 52 connected through contacts 118 to line 46 by line 119.

As can be seen from the above description, the present invention provides a simple circuit consisting of a minimum number of parts that can readily be incorporated into any traveling bridge to allow the bridge to be continued to operate even though one switch has malfunctioned. Also, the circuit is arranged in such a manner that a plurality of bridges can simultaneously be controlled in a single tank which allows the use of tanks of unlimited width. The width of the tank is considered to be the dimension transverse to the direction of flow of liquid between the inlet and the outlet.

We claim:

1. A sewage treatment tank having a traveling bridge reciprocated thereon; reversible motor means for driving said bridge; circuit means controlling said motor means, said circuit means including primary position responsive means cooperating with said motor means for reversing said motor means and secondary position responsive means for continuing reversal of said motor means when said primary position responsive means malfunctions; and means spaced along said tank for actuating said position responsive means.

2. A sewage treatment tank as defined in claim 1, further including signal means in said circuit means actuated in response to actuation of said secondary position responsive means to indicate said motor means is being operated by said secondary position responsive means.

3. A sewage treatment tank as defined in claim 1, in which said circuit means includes first and second circuits respectively actuating said motor means in opposite directions; relay means connected to said first and second circuits and said primary and secondary position responsive means, said relay means having a first position connecting said circuits to said primary position responsive means and a second position connecting said circuits to said secondary position responsive means; and a holding circuit for holding said relay means in said second position after said secondary position responsive means has been actuated.

4. A sewage treatment tank as defined in claim 1, in which said tank has two traveling bridges reciprocated thereon with each bridge having a reversible motor means cooperating therewith, each of said motor means operated by a circuit means as defined in claim 1 cooperating therewith; and means on one of said bridges for actuating the position responsive means cooperating with the other of said bridges when said bridges approach each other to prevent collision of said bridges.

5. A sewage treatment tank as defined in claim 4, in which each of said position responsive means is a two position switch means and said means spaced along said tank includes three spaced trip means for moving said switch means between first and second positions.

6. A sewage treatment tank as defined in claim 4, in which each of said circuit means includes (1) first and second circuits respectively actuating the associated motor means in opposite directions, (2) relay means connected to said circuits and said primary and secondary position responsive means, said relay means having a first position connecting said circuits to said primary position responsive means and a second position connecting said circuits to said secondary position responsive means, and (3) a holding circuit for holding said relay means in said second position after said secondary position responsive means has been actuated.

7. A sewage treatment tank as defined in claim 6, in which said means spaced along said tank includes three spaced stops for actuating said position responsive means with one of said spaced stops actuating the position responsive means in both circuit means.

8. A sewage treatment tank as defined in claim 7, in which said position responsive means are switch means carried by said bridge and positioned so that said bridges traverse a common area adjacent said one of said spaced stops.

9. A sewage treatment tank having a plurality of traveling bridges reciprocated between extreme positions thereon by reversible motor means and circuit means for each reversible motor means, each circuit means including primary position responsive means cooperating with said motor means for reversing said motor means, secondary position responsive means or continuing reversal of said motor means when said primary position responsive means malfunctions; means spaced along said tank for actuating said position responsive means; and means carried by one of said bridges for actuating the position responsive means on the next adjacent bridge.

10. A sewage treatment tank as defined in claim 9, in which said position responsive means each include a two position switch means and in which said means spaced along said tank includes fixed trip means with one of said fixed trip means moving the switch means of two adjacent bridges from one position to the other position.

11. A sewage treatment tank as defined in claim 9, in which each circuit means includes first and second circuits respectively actuating the associated motor means in opposite directions, and relay means connected to said circuits and said primary and secondary position responsive means, said relay means having a first position connecting said primary position responsive means to said circuits and a second position connecting said secondary position responsive means to said circuits.

12. A sewage treatment tank as defined in claim 11, in which each circuit includes a holding circuit cooperating with the secondary position responsive means for holding said relay means in said second position after said secondary position defining means is actuated, and switch means in said holding circuit for manually opening said holding circuit.

13. A sewage treatment tank as defined in claim 12, further including signal means in each circuit means activated in response to movement of said relay means to said second position to indicate the associated circuit means is being operated by said secondary position responsive means.

14. A sewage treatment tank as defined in claim 13, in which there are two bridges reciprocated in one tank and the position responsive means are two position switches, and in which said means along said tank includes three spaced trip means with the intermediate trip means actuating the switches for both bridges.

15. A sewage treatment tank as defined in claim 14, in which said switches are positioned on the associated bridges so that both bridges traverse an intermediate portion of said tank.

* * * * *